(12) United States Patent
Thangamani et al.

(10) Patent No.: US 9,626,277 B2
(45) Date of Patent: Apr. 18, 2017

(54) ANOMALY ANALYSIS FOR SOFTWARE DISTRIBUTION

(71) Applicant: Microsoft Technology Licensing, LLC, Redmond, WA (US)

(72) Inventors: Aarthi Thangamani, Redmond, WA (US); Bryston Nitta, Redmond, WA (US); Chris Day, Kirkland, WA (US); Divyesh Shah, Redmond, WA (US); Nimish Aggarwal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/676,214

(22) Filed: Apr. 1, 2015

(65) Prior Publication Data

US 2016/0292065 A1    Oct. 6, 2016

(51) Int. Cl.

| | | |
|---|---|---|
| *G06F 9/455* | (2006.01) | |
| *G06F 21/00* | (2013.01) | |
| *G06F 11/36* | (2006.01) | |
| *G06F 9/445* | (2006.01) | |
| *G06F 11/07* | (2006.01) | |
| *G06F 11/34* | (2006.01) | |
| *H04L 12/24* | (2006.01) | |
| *G06F 21/55* | (2013.01) | |

(52) U.S. Cl.
CPC ........... *G06F 11/3616* (2013.01); *G06F 8/65* (2013.01); *G06F 11/0706* (2013.01); *G06F 11/079* (2013.01); *G06F 11/34* (2013.01); *H04L 41/00* (2013.01); *G06F 21/554* (2013.01)

(58) Field of Classification Search
CPC ....... G06F 11/0709; G06F 8/65; G06F 21/554
See application file for complete search history.

(56) References Cited

U.S. PATENT DOCUMENTS

| | | | |
|---|---|---|---|
| 6,141,683 A | 10/2000 | Kraml et al. | |
| 8,281,019 B1 | 10/2012 | Woodard et al. | |
| 8,645,946 B2 | 2/2014 | Wookey | |
| 8,719,809 B2 | 5/2014 | Gokhale | |
| 8,745,703 B2 * | 6/2014 | Lambert | G06F 21/554 726/5 |
| 2004/0106875 A1 | 6/2004 | Menzie et al. | |

(Continued)

OTHER PUBLICATIONS

Subutai Ahmad and Scott Purdy, Real-Time Anomaly Detection for Streaming Analytics, Jul. 8, 2016, retrieved online on Nov. 9, 2016, pp. 1-10. Retrieved from the Internet: <URL: https://arxiv.org/pdf/1607.02480.pdf>.*

(Continued)

*Primary Examiner* — Thuy Dao
*Assistant Examiner* — Hanh T Bui

(57) ABSTRACT

A population of devices provides telemetry data and receives software changes or updates. Event buckets for respective events are found. Event buckets have counts of event instances, where each event instance is an occurrence of a corresponding event reported as telemetry by a device. Records of the software changes are provided, each change record representing a software change on a corresponding device. The event buckets are analyzed to identify which indicate an anomaly. Based on the change records and the identified event buckets, correlations between the software changes and the identified event buckets are found.

13 Claims, 13 Drawing Sheets

(56) References Cited

U.S. PATENT DOCUMENTS

| | | | |
|---|---|---|---|
| 2005/0015667 A1 | 1/2005 | Aaron | |
| 2005/0132351 A1 | 6/2005 | Randall et al. | |
| 2008/0195369 A1* | 8/2008 | Duyanovich | G06F 11/0709 703/22 |
| 2009/0320136 A1* | 12/2009 | Lambert | G06F 21/554 726/25 |
| 2010/0014432 A1* | 1/2010 | Durfee | H04L 41/0631 370/242 |
| 2010/0292959 A1 | 11/2010 | Gross et al. | |
| 2011/0314138 A1 | 12/2011 | Kobayashi et al. | |
| 2011/0321007 A1 | 12/2011 | Marum et al. | |
| 2013/0332594 A1 | 12/2013 | Dvir et al. | |
| 2014/0006844 A1 | 1/2014 | Alderman et al. | |
| 2014/0033174 A1 | 1/2014 | Farchi et al. | |
| 2014/0068326 A1* | 3/2014 | Quinn | G06F 11/0709 714/15 |
| 2014/0337608 A1* | 11/2014 | Lee | G06F 8/65 713/1 |
| 2015/0033084 A1* | 1/2015 | Sasturkar | G06F 11/0709 714/46 |
| 2015/0033086 A1* | 1/2015 | Sasturkar | G06F 11/0709 714/57 |
| 2016/0062815 A1* | 3/2016 | Ivanova | G06F 11/0751 714/26 |
| 2016/0147585 A1* | 5/2016 | Konig | G06F 11/3419 714/37 |
| 2016/0283310 A1* | 9/2016 | Mankovskii | G06F 11/0709 |
| 2016/0292065 A1* | 10/2016 | Thangamani | G06F 8/65 |

OTHER PUBLICATIONS

Daniele Toscani et al., Dynamic update of data analysis models in emergency systems, ACM, Jun. 2009, retrieved online on Nov. 9, 2016, pp. 37-41. Retrieved from the Internet: <URL: http://delivery.acm.org/10.1145/1590000/1582389/p37-toscani.pdf?>.*

International Search Report, application No. PCT/US2016/023337, mailed May 30, 2016, 13 pages.

Yairi, et al., "Telemetry-mining: A machine learning approach to anomaly detection and fault diagnosis for space systems", In Proceedings of Second IEEE International Conference on Space Mission Challenges for Information Technology, Jul. 17, 2006, 8 pages.

Manikas, K. and Hansen, K.M., "Reviewing the Health of Software Ecosystems—A Conceptual Framework Proposal", In Proceedings of the 5th International Workshop on Software Ecosystems, Potsdam, Germany, Jun. 11, 2013, 12 pages.

"Second Written Opinion Issued in PCT Application No. PCT/US2016/023337", Mailed Date: Feb. 9, 2017, 7 Pages.

* cited by examiner

220

226

| updateID | asset | version | ... |
|---|---|---|---|
| ... | ... | ... | ... |
| R3418 | source.cpp | 3.4 | ... |
| R3419 | app.cs | 1.8.1 | ... |
| ... | ... | ... | ... |

222

| updateID | package location | release date | ... |
|---|---|---|---|
| ... | ... | ... | ... |
| R3418 | URL-A | 1/2/2015 | ... |
| R3419 | filename | 2/10/2015 | ... |
| ... | ... | ... | ... |

224

| updateID | deviceID | application date | rollback date |
|---|---|---|---|
| ... | ... | ... | ... |
| R3418 | 213047863 | 3/1/2015 | ... |
| R3419 | 368238431 | 3/2/2015 | ... |
| R3419 | 213047863 | 3/7/2015 | ... |
| R3452 | 368238431 | 3/2/2015 | 3/3/2015 |
| ... | ... | ... | ... |

FIG. 6

ANOMALY ANALYSIS FOR SOFTWARE DISTRIBUTION

BACKGROUND

Devices that run software usually require updates over time. The need for software updates may be driven by many factors, such as fixing bugs, adding new functionality, improving performance, maintaining compatibility with other software, and so forth. While many techniques have been used for updating software, an update typically involves changing the source code of a program, compiling the program, and distributing the program to devices where the updated program will be executed.

It is becoming more common for programs to be compiled for multiple types of devices and operating systems. Executable code compiled from a same source code file might end up executing on devices with different types of processors, and different types or versions of operating systems. Updates for such cross-platform programs can be difficult to assess.

In addition, the increasing network connectivity of devices has led to higher rates of updating by software developers and more frequent reporting of performance-related data (telemetry) by devices. In a short time period, a device might receive many software updates and might transmit many telemetry reports to a variety of telemetry collectors. A software distribution system might rapidly issue many different software updates to many different devices. As devices provide feedback telemetry about performance, crashes, stack dumps, execution traces, etc., around the same time, many software components on the devices might be changing. Therefore, it can be difficult for a software developer to use the telemetry feedback to decide whether a particular software update created or fixed any problems. If an anomaly is occurring on some devices, it can be difficult to determine whether any particular software update is implicated, any conditions under which an update might be linked to an anomaly, or what particular code-level changes in a software update are implicated. In short, high rates of software updating and telemetry reporting, perhaps by devices with varying architectures and operating systems, has made it difficult to find correlations between software updates (or source code changes) and anomalies manifested in telemetry feedback.

Techniques related to finding anomalies in telemetry data and finding correlations between anomalies and software updates are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A population of devices provides telemetry data and receives software changes or updates. Event buckets for respective events are found. Event buckets have counts of event instances, where each event instance is an occurrence of a corresponding event reported as telemetry by a device. Records of the software changes are provided, each change record representing a software change on a corresponding device. The event buckets are analyzed to identify which indicate an anomaly. Based on the change records and the identified event buckets, correlations between the software changes and the identified event buckets are found.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 6 shows an example of an update store.

DETAILED DESCRIPTION

Figure 1:
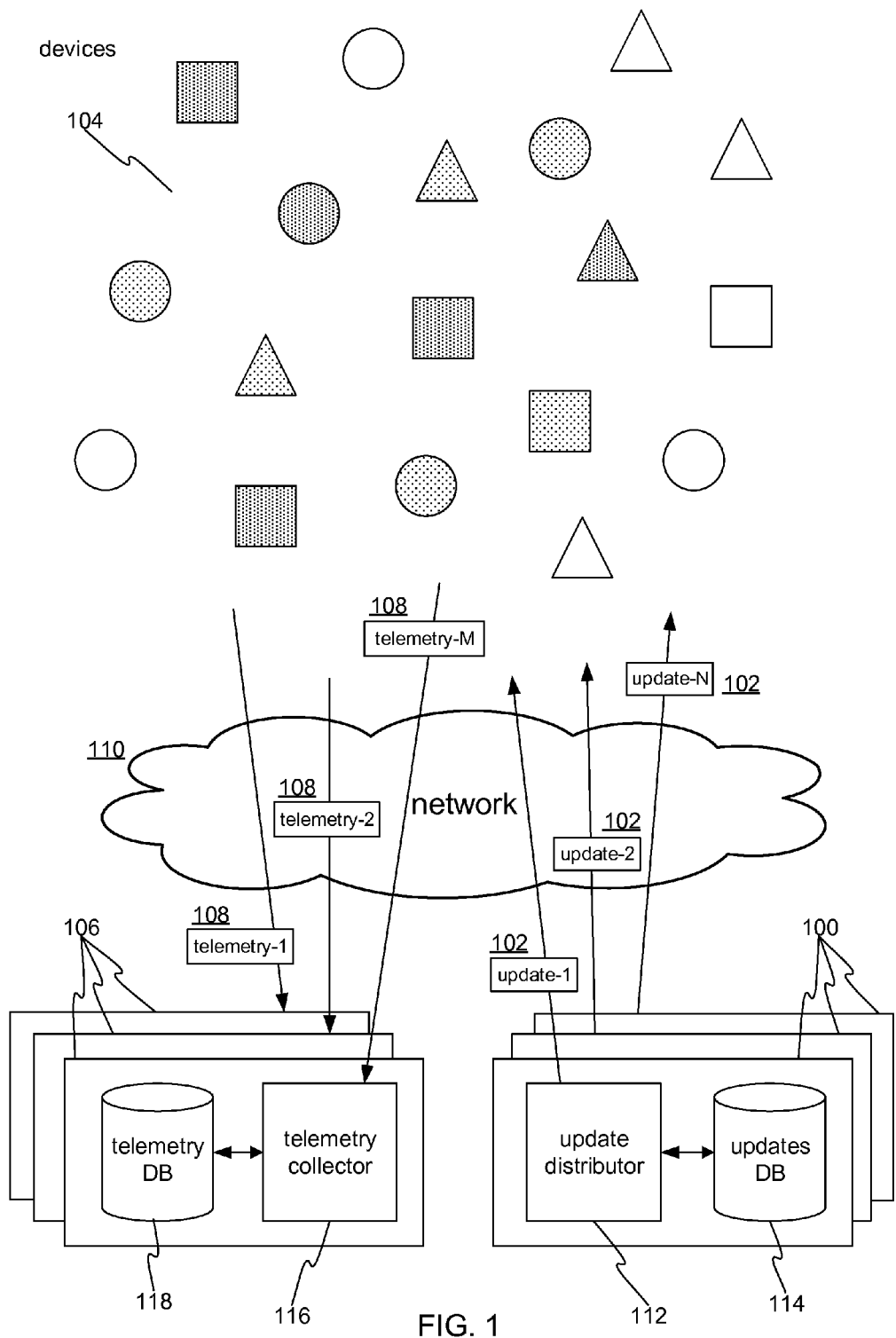
FIG. 1 shows an example of a software ecosystem.

FIG. 1 shows an example of a software ecosystem.

Update services 100 provide software updates 102 to devices 104. Telemetry collection services 106 collect telemetry reports 108 from the devices 104 via a network 110. The shapes of the graphics representing the devices 104 portray different types of processors, such as ARM, x86, PowerPC™, Apple A4 or A5™, Snapdragon™, or others. The shading of the graphics representing the devices 104 indicates different operating system types or versions, for example, Ubuntu™, Apple iOS™, Apple OS X™, Microsoft Windows™, and Android™. The updateable devices 104 may be any type of device with communication capability, processing hardware, and storage hardware working in conjunction therewith. Gaming consoles, cellular telephones, networked appliances, notebook computers, server computers, set-top boxes, autonomous sensors, tablets, or other types of devices with communication and computing capabilities are all examples of devices 104, as referred to herein.

An update 102 can be implemented in a variety of ways. An update 102 can be a package configured or formatted to be parsed and applied by an installation program or service running on a device 104. An update 102 might be one or more files that are copied to appropriate file system locations on devices 104, possibly replacing prior versions. An update 102 might be a script or command that reconfigures software on the device 104 without necessarily changing executable code on the device 104. For example, an update 102 might be a configuration file or other static object used by corresponding software on the device 104. An update 102 can be anything that changes the executable or application. Commonly, an update 102 will involve replacing, adding, or removing at least some executable code on a device 104.

An update service 100, in its simplest form, provides software updates 102 to the devices 104. For example, and update service 100 might be an HTTP (hypertext transfer protocol) server servicing file download requests. An update service 100 might be more complex, for instance, a so-called software store or marketplace that application developers use to propagate updates. An update service 100 might also be a backend service working closely with a client side component to transparently select, transmit, and apply updates. In one embodiment, the update service 100 is a peer-to-peer service where peers share updates with each other. In another embodiment, an update service 100 is a network application or service running on a group of servers, for instance as a cloud service, that responds to requests from devices 104 by transmitting software updates 102. Any known technology may be used to implement an update service 100. Moreover, as shown in FIG. 1, there may be multiple update services 100, possibly operated by different entities or firms.

In one embodiment, an update service 100 includes an update distributor 112 and an updates database 114. The updates database 114 may have records for respective updates 102. Each update record identifies the corresponding update 102, information about the update 102 such as an intended target (e.g., target operating system, target hardware, software version, etc.), a location of the update 102, and other related data as discussed further below. The update distributor 112 cooperates with the updates database 114 to determine what updates are to be made available to, or transferred to, any particular device 104. As will be described further below, finding correlations between updates and anomalies can be facilitated by keeping track of which particular updates 102 have been installed on which particular devices 104. This can be tracked in the updates database 114 or elsewhere. For this purpose, in one embodiment, each time a particular update 102 is provided to a particular device 104, an update instance record is stored identifying the particular update, the particular device 104, and the update 102. In some embodiments, this information is obtained indirectly, for instance from logs received from a device 104, perhaps well after an update has been applied.

The telemetry reports 108 are any communications pushed or pulled from the devices 104. Telemetry reports 108 indicate respective occurrences on the devices 104, and are collected by a telemetry collector 116 and then stored in a telemetry database 118. Examples of types of telemetry reports 108 that can be used are: operating system crash dumps (possibly including stack traces), application crash dumps, system log files, application log files, execution trace files, patch logs, performance metrics (e.g., CPU load, memory usage, cache collisions, network performance statistics, etc.), or any other information that can be tied to software behavior on a device 104. As discussed in detail further below, in one embodiment, text communications published on the Internet are mined as a telemetry source. As will become apparent, embodiments described herein can improve the diagnostic value—with respect to updates—of telemetry sources that provide information about general system health or that are not specific-to or limited-to any particular application or software. By using such telemetry sources on a large scale, it may become possible to find correlations in mass that might not be discoverable on an individual device basis.

Regardless of the type of telemetry data, a telemetry collection service 106 will usually have some collection mechanism, e.g., a telemetry collector 116, and a storage or database—e.g., a telemetry database 118—that collates and stores incoming telemetry reports 108. Due to potentially large volumes of raw telemetry data, in some embodiments, key items of data can be extracted from incoming telemetry reports 108 and stored in the telemetry database 118 before disposing of the raw telemetry data.

Figure 2:
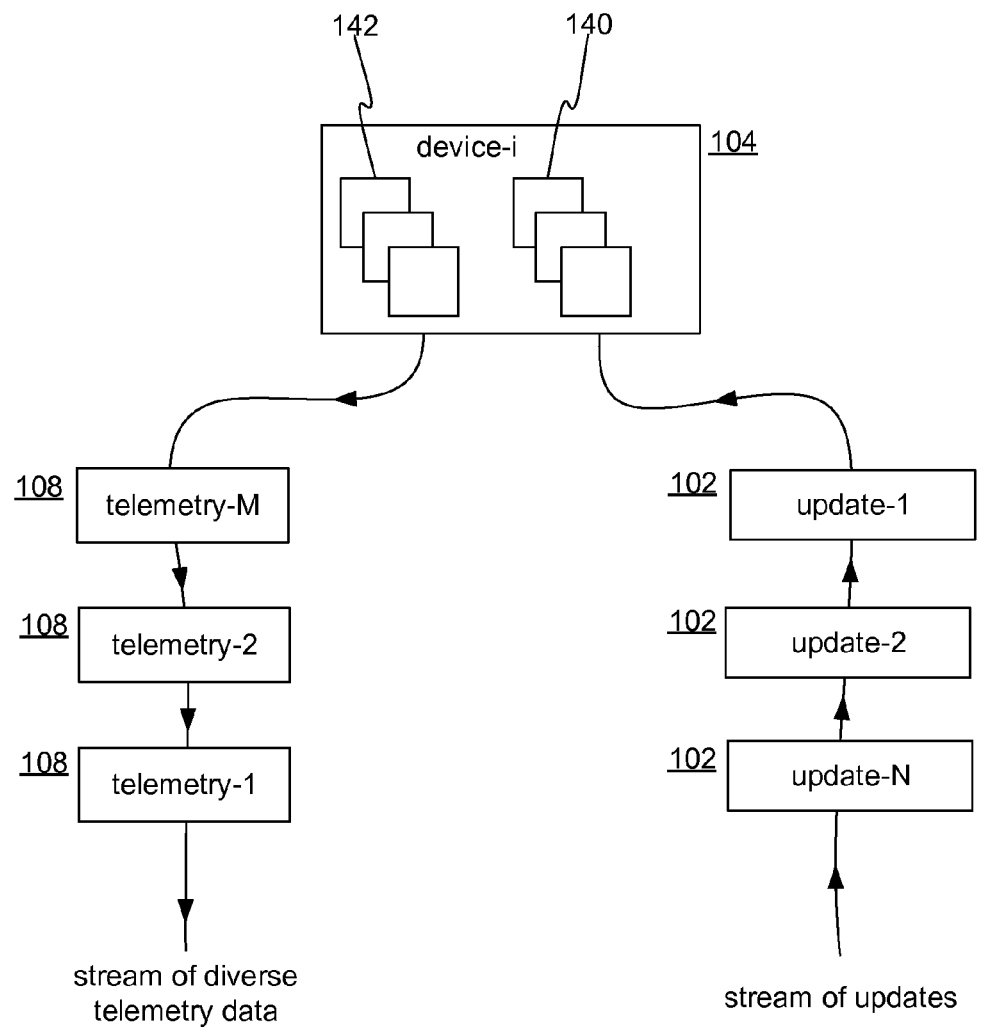
FIG. 2 shows a device receiving updates and transmitting telemetry reports.

FIG. 2 shows a device 104 receiving updates 102 and transmitting telemetry reports 108. As discussed above, modern devices often have the ability to communicate frequently over a short period of time (e.g., minutes, hours, or even a few days). A device may therefore have a steady flow of incoming software updates 102 and outgoing telemetry reports 108 passing through the network 110. The updates 102 may be received and handled by one or more update elements 140. An update element 140 can be an application, a system service, a file system, or any other software element that can push or pull updates 102. Some update elements 140 may also have logic to apply an update 102 by unpacking files, installing binary files, setting up configuration data, registering software, etc. An update element 140 may simply be a storage location that automatically executes incoming updates 102 in the form of scripts. In sum, an update element 140 can be any known tool or process for enabling software updates 102.

A device 104 may also have one or more telemetry reporting elements 142. As discussed above, any type of telemetry data can be emitted in telemetry reports 108. Any available reporting frameworks may be used, for instance Crashlytics™, TestFlight™, Dr. Watson™, the OS X Crash Reporter™, BugSplat™, the Application Crash Report for Android Tool, etc. A reporting element 142 can also be any known tool or framework such as the diagnostic and logging service of OS X, the Microsoft Windows instrumentation tools, which will forward events and errors generated by applications or other software, etc. A reporting element 142 can also be an application or other software unit that itself sends a message or other communication when the application or software unit encounters diagnostic-relevant information such as a performance glitch, a repeating error or failure, or other events. In other words, software can self-report. The telemetry reports 108 from the reporting elements 142 may go to multiple respective collection services 106, or they may to go a same collection service 106.

The telemetry reports 108 from a device 104 will at times convey indications of events that occur on the device. The flow of telemetry reports 108 can collectively function like a signal that includes features that correspond to events or occurrences on the device. Such events or anomaly instances can, as discussed above, be any type of information that is potentially helpful for evaluating software performance, such as operating system or application crashes, errors self-reported by software or handled by the device's operating system, excessive or spikey storage, processor, or network usage, reboots, patching failures, repetitive user actions (e.g., repeated attempts to install an update, repeatedly restarting an application, etc.).

Figure 3:
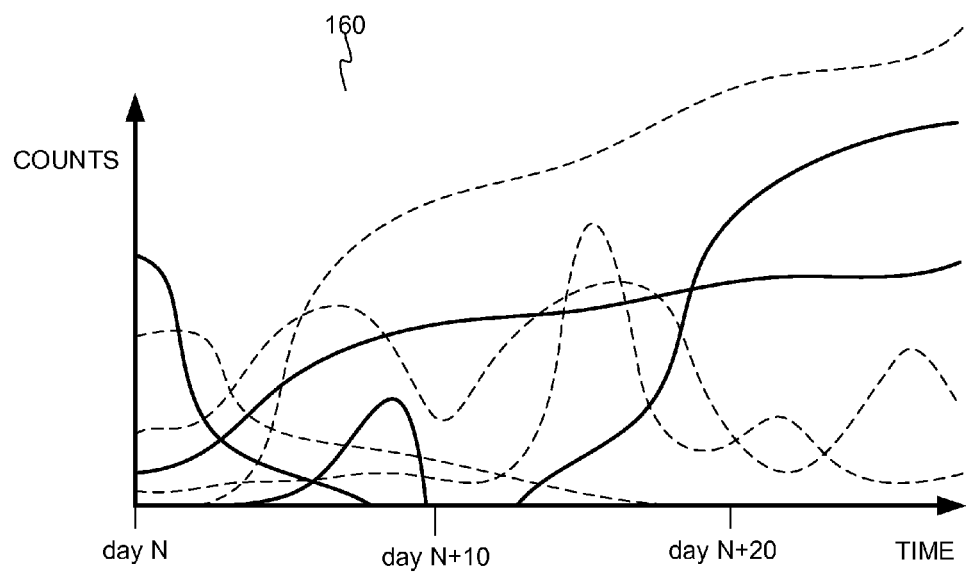
FIG. 3 shows a graph that illustrates a global view of updates and telemetry feedback over time for a population of devices.
Figure 3:
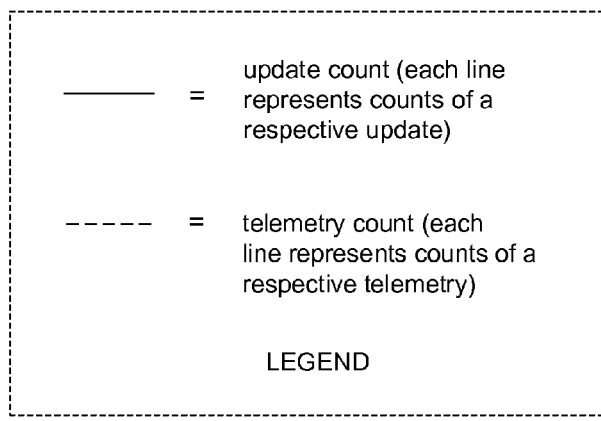

FIG. 3 shows a graph 160 that illustrates a global view of updates and telemetry feedback over time for a population of devices 104. Over time, the number of updates applied on devices 104 and the number of event instances conveyed in telemetry reports varies over time. As used herein, an update refers to a same change applied to many devices 104. An update instance refers to an application of a particular update on a particular device 104. As used herein, event instances are things that occur on different devices 104 and which can be recorded by or reflected by telemetry on the devices. As also used herein, when event instances on different devices 104 are the same (e.g., a same program crashes, a same function generates an error, a same performance measure is excessive, a same item is entered in a log file, etc.), those same event instances are each instances of the same event. As will be described below, in some cases, an event may be uncovered by analyzing and filtering event instances. In some cases, further analysis may indicate that an event is an anomaly, which is an event that is statistically unexpected or unusual or otherwise of interest. As shown by the graph 160, for a mix of concurrent update and telemetry "signals", finding potentially causal relationships between particular updates and particular anomalies in the telemetry data can be difficult. Lag, noise, and other factors discussed below can obscure relationships.

Figure 4:
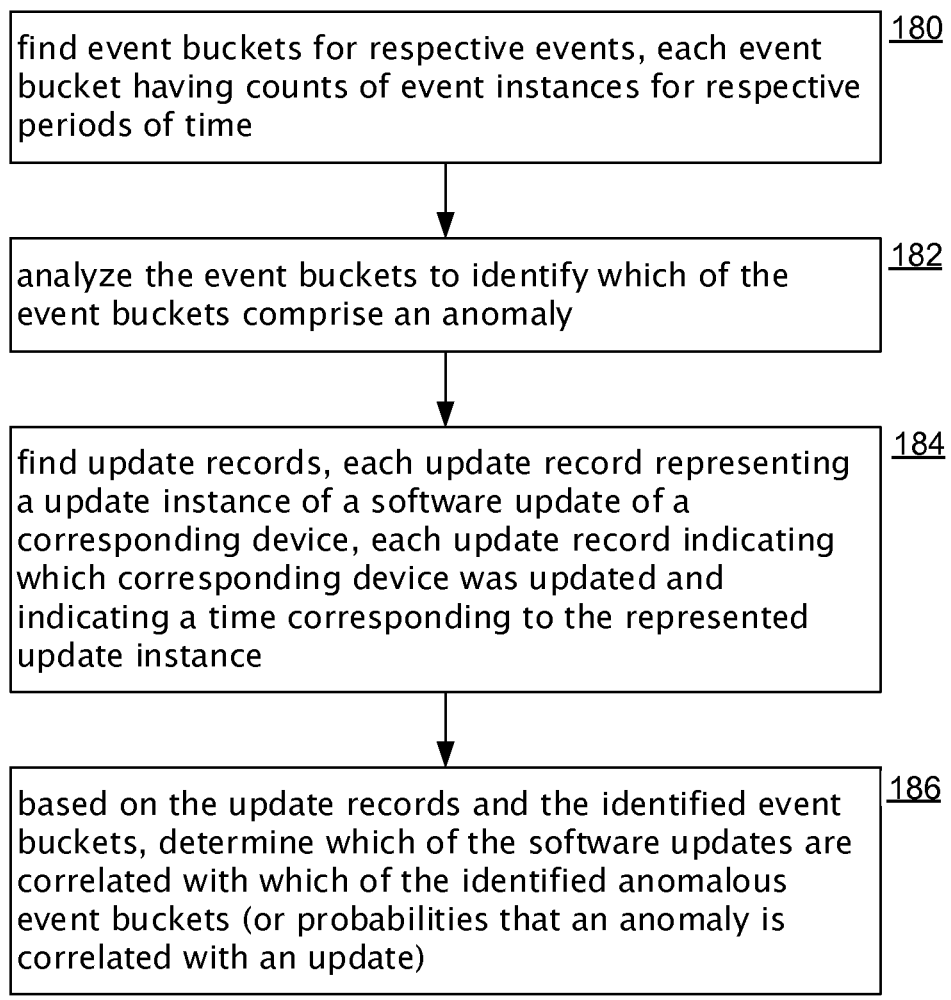
FIG. 4 shows a general process for finding correlations between updates and anomalies.

FIG. 4 shows a general process for finding correlations between updates and anomalies. The process assumes the availability of appropriate data/records, without regard for how the records are collected, stored, or accessed. The process can be triggered in a variety of ways. For example, the process may be part of a periodic process that attempts to identify problematic updates, or the process may be manually initiated, perhaps with a particular user-selected update being targeted for analysis by user input. The process can also run continuously, iteratively processing new data as it becomes available.

In any case, the process begins at step 180 by forming event buckets. Each event bucket is a collection of event instances that correspond to a same event. For example, an event bucket may consist of a set of event instances that each represent a system crash, or a same performance trait (e.g., poor network throughput), or any error generated by a same binary executable code (or a same function, or binary code compiled from a same source code file), or a particular type of error such as a memory violation, etc.

An event bucket can be formed in various ways, for example, by specifying one or more properties of event instance records, by a clustering algorithm that forms clusters of similar event instance records, by selecting an event instance record and searching for event instance records that have some attributes in common with the selected event record, and so forth. Event instance records are generally dated (the terms "date" and "time" are used interchangeably herein and refer to either a date, or a date and time, a period of time, etc.). Therefore, each bucket is a chronology of event instances, and counts of those event instances can be obtained for respective regular intervals of time.

As will be described later, one or more filters appropriate to the type of telemetry data in a bucket may be applied to remove event instance records that would be considered noise or otherwise unneeded. For instance, records may be filtered by date, operating system type or version, processor, presence of particular files on a device or in a stack trace, and/or any other condition.

Figure 5:
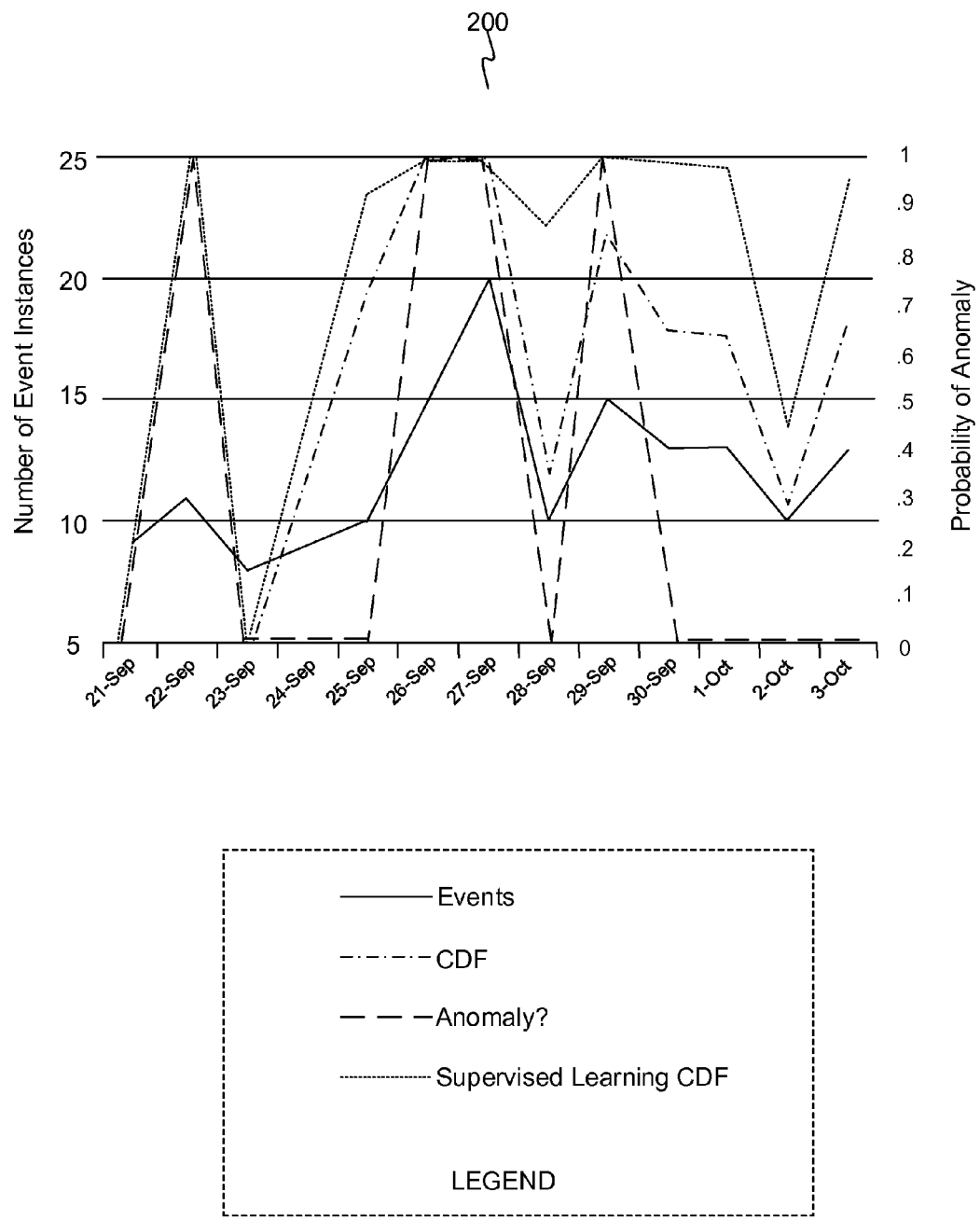
FIG. 5 shows a graph.

At step 182, each event bucket is statistically analyzed to identify which buckets indicate anomalies, or more specifically, to identify any anomalies in each bucket. Various types of analysis may be used. For example, a regression analysis may be used. In one embodiment, anomalies are identified using a modified cumulative distribution function (CDF) with supervised machine learning. A standard CDF determines the probability that number X is found in the series of numbers S. For example, X may be a count of event instances for a time period Z, such as a day, and the series S is the number of events, for example for previous days 0 to Z-1. Additionally, certain time periods may be removed from the series S if they were independently determined to be a true-positive anomaly (e.g., they may have been identified by a developer). To identify an anomaly, an anomaly threshold is set, for instance to 95% or 100%; if a candidate anomaly (an X) has a probability (of not being in the series S) that exceeds the anomaly threshold, then an anomaly has been identified. FIG. 5 shows a graph 200. The graph 200 compares the number of events for a given telemetry point over time and the given CDF. The graph 200 also shows a developer's feedback and a result of a CDF modified by supervised learning. As noted, other types of correlation analyses may be used, for instance [examples][LOJ1].

Returning to FIG. 4, at step 184, for one or more updates, corresponding sets of update instance records are found. That is, updates are selected, perhaps by date, operating system, or update content (e.g., does an update correspond to a particular source code file), and the corresponding update instance records are found, where each update instance record represents the application of a particular update to a particular device at a particular time or time span. The update instance records may also include records that indicate that an update was rolled back, superseded, or otherwise became moot with respect to the corresponding device. For some devices, update instance records can indicate intermittent presence of the corresponding update (e.g., an update may be applied, removed, and applied again).

At step 186, correlations are found between the updates and the event buckets with anomalies. Any of a variety of heuristics may be used to find correlations or probabilities of correlations. That is, one or more heuristics are used to determine the probability of a particular anomaly being attributable or correlated to a particular software update. Among the heuristics that can be used, some examples are: determining the probability that a particular binary (or other software element) in a software update is a source of a telemetry point; determining the extent to which an anomaly aligns with the release of software update; finding a deviation between an update deployment pattern and an anomaly pattern; determining whether an anomaly is persistent after deployment of an update (possibly without intervention). In one embodiment, each applicable heuristic can be given a weight. The weight is adjusted via a feedback loop when reported anomalies are marked by a user as either (i) a true-positive or (ii) false-positive. These heuristics and weights can be combined to compute a probability or percentage for each respective anomaly and software update pair. In this way, many possible updates can be evaluated against many concurrent anomalies and the most likely causes can be identified. For run-time optimization, a software update can be excluded from calculation once the software update has reached a significant deployment with no issues or, in the case of an update intended to fix an issue, when the corresponding issues are determined to have been resolved.

Within the concept of finding links between updates and anomalies, a number of variations of the algorithm in FIG. 4 can be used. In addition, the steps in FIG. 4 can be performed in different orders and asynchronously. In one embodiment, an update may be initially selected, for example by a developer interested in the update, and the identity of the update is used to select event instance records from the devices that have had the update applied. In another embodiment, buckets can be independently formed and analyzed to identify anomalies. An anomaly is selected, for example by a developer or tester. Update instance records are selected based on some relationship with the anomaly (e.g., concurrence in time, presence of an update element in a trace log, stack trace, or crash file, etc.). Correlations between the anomaly and the respective updates are then computed using any of the heuristics mentioned above.

Figure 7:
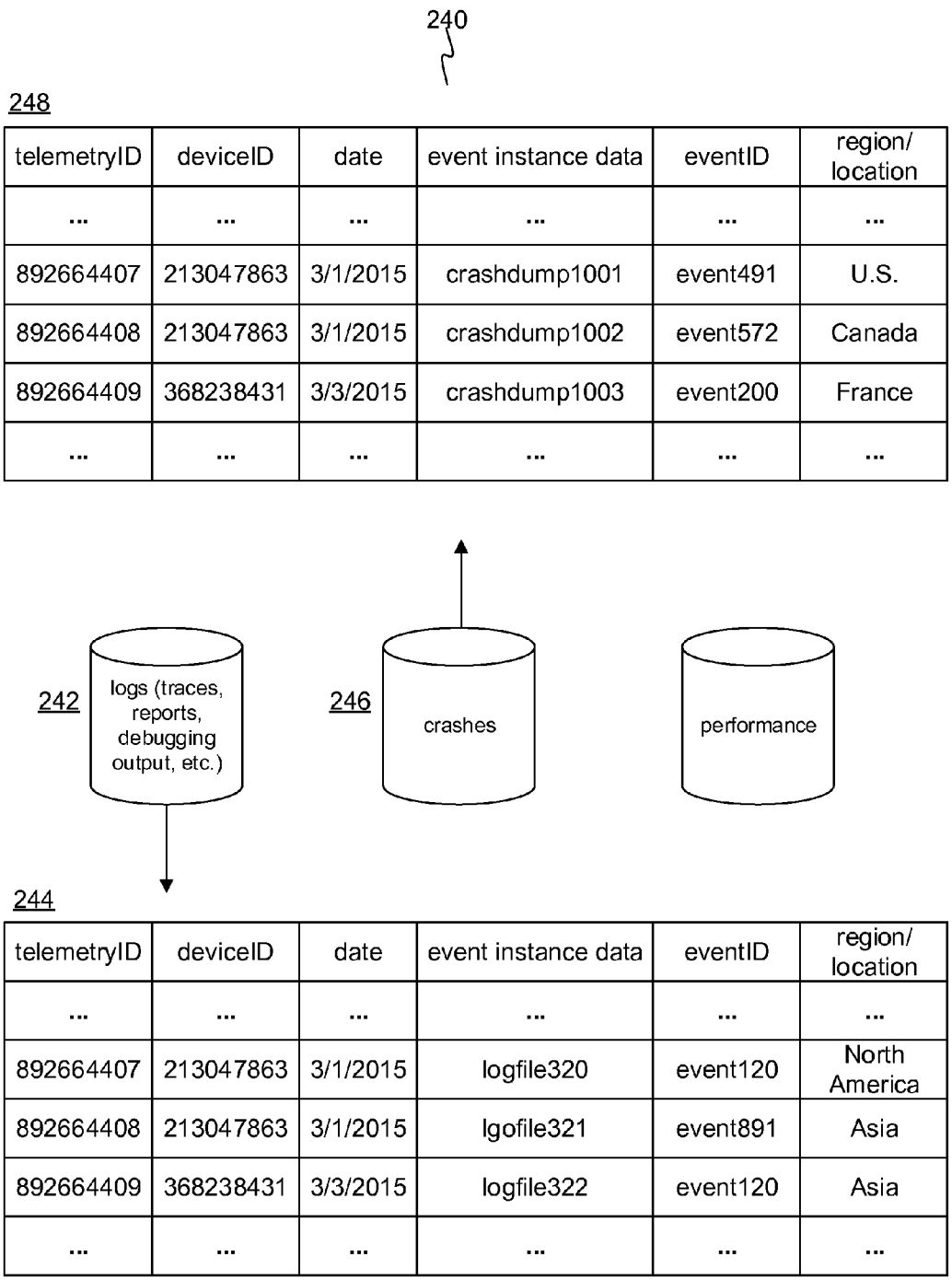
FIG. 7 shows an example of a telemetry store.

As discussed with reference to FIG. 1, applications of updates and telemetry reports are collected and stored. In one embodiment, raw telemetry data and update records are accessed and the information needed for finding update-anomaly correlations is extracted, normalized, and stored in another data store or database. FIG. 6 shows an example of an update store 220. FIG. 7 shows an example of a telemetry store 240.

The update store 220 includes an update table 222 storing records of updates, an update instance table 224 storing records of which updates were applied to which devices and when, and a change table 226 storing records of changes associated with an update. The update instance records and the change records link back to related update records. The update records store information about the updates and can be created when an update is released or can be initiated by a user when analysis of an update is desired. The update records can store any information about the updates, such as versions, release dates, locations of the bits, files, packages, information about target operating systems or architectures, etc. The update instance records store any information about an update applied to a device, such as a time of the update, any errors generated by applying the update, and so on.

The change table 226 stores records indicating which assets are changed by which updates. An asset is any object on a device, such as an executable program, a shared library, a configuration file, a device driver, etc. In one embodiment, the change table 226 is automatically populated by a crawler or other tool that looks for new update records, opens the related package, identifies any affected assets, and records same in the change table 226. The changes can also be obtained from a manifest, if available. In one embodiment, a source code control system is accessed to obtain information about assets in the update. If an executable file is in the update, the identity of the executable file (e.g., filename and version) is passed to the source code control system. The source code control system returns information about any source code files that were changed since the executable file was last compiled. In other words, the source code control system provides information about any source code changes that relate to the update. As will be described further below, this can help extend the correlation analysis to particular source code files or even functions or lines of source code.

Returning to FIG. 7, the telemetry store 240 includes a table for each type of telemetry source. For example, a logging telemetry source 242 provides logging or trace data, which is stored in a logging table 244. In one embodiment, the log or trace files are parsed to extract pertinent information, which is populated into the logging table 244. A crash telemetry source 246 provides application and/or operating system crash dumps. A crash parsing engine analyzes the crashes and extracts relevant information such as stack trace data (e.g., which functions or files were active during a crash), key contents of memory when a crash occurred, the specific cause of the crash, and other information. The crash information is stored in a crash table 248. In another embodiment, links to crash dump files are kept in the crash table 248 and crash dumps are parsed when needed. As noted above, other types of telemetry data can be similarly managed. For instance, performance telemetry data, user-initiated feedback, custom diagnostics, or others.

It may be noted that in the case of an application crash telemetry source with stack traces, to help manage the scale of telemetry data, a list of binaries, their versions, and bounding dates can be used to find all failures (event instances) within the bounding dates that have one of the binaries in their respective stack traces.

In one embodiment, a telemetry source can be provided by monitoring public commentary. User feedback is obtained by crawling Internet web pages, accessing public sources (e.g., Twitter™ messages) for text or multimedia content that makes reference to software that is subject to updates or that might be affected by updates. For a given update, a set of static and dynamic keywords are searched for in content to identify content that is relevant. Static keywords are any words that are commonly used when people discuss software problems, for instance "install", "reboot", "crashing", "hanging", "uninstall", etc. Dynamic keywords are generated according to the update, for example, the name or identifier of an update, names of files affected by the update, a publisher of the update, a name of an operating system, and others. When keywords sufficiently match an item of user-authored content, a record is created indicating the time of the content, the related update (if any), perhaps whether the content was found (using known text analysis techniques) to be a positive or negative comment, or other information that might indicate whether a person is having difficult or success with an update. Counts of dated identified user feedback instances can then serve as another source of telemetry buckets that can be correlated with updates.

Figure 8:
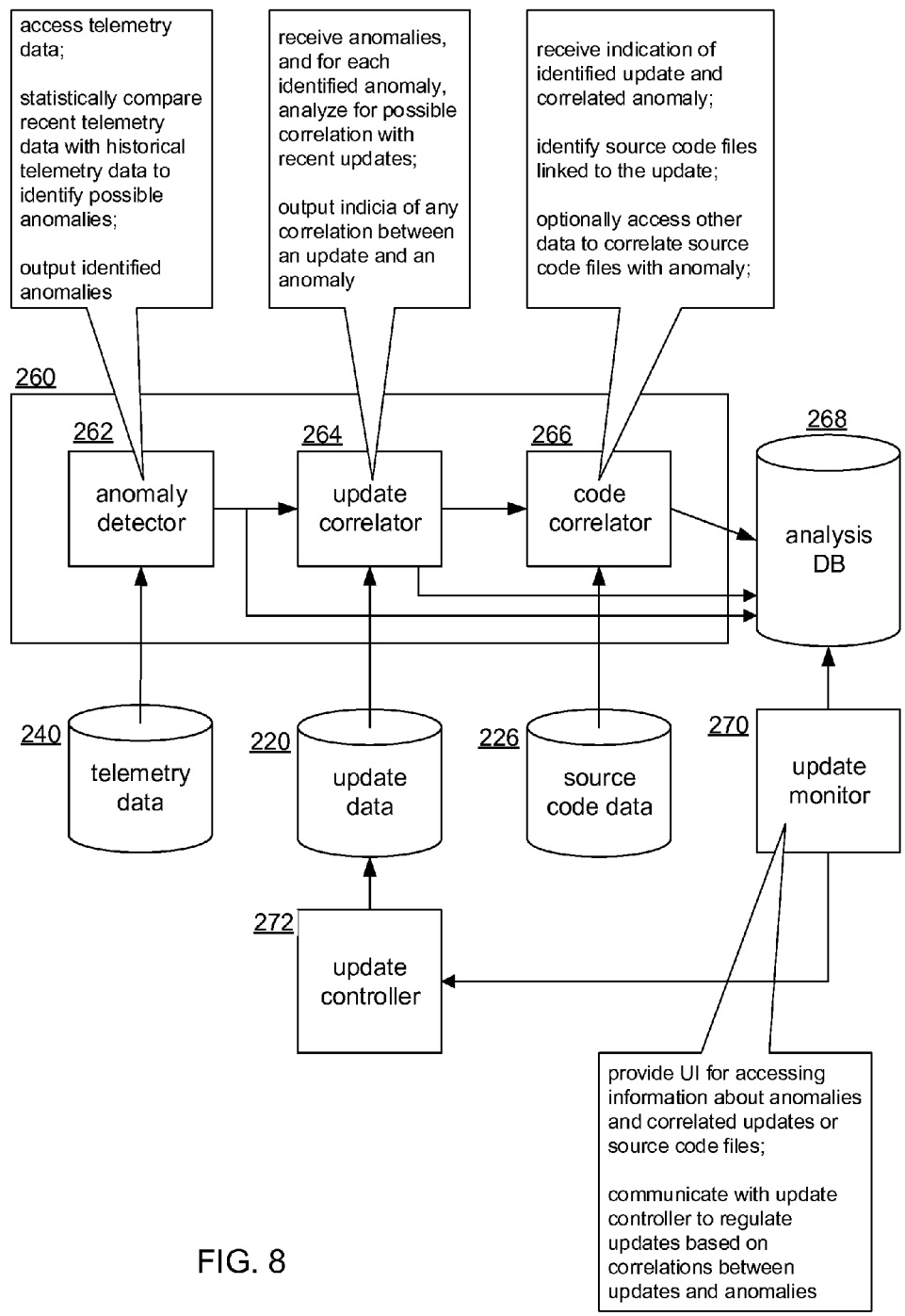
FIG. 8 shows an example correlation engine.

FIG. 8 shows an example correlation engine 260 for correlating telemetry data with updates and possibly source code elements. An anomaly detector 262 may first select from the telemetry store 240 any telemetry event instance records, for example any new telemetry event instance records or an records that occurred after an analysis date or after a date when one or more updates were released. Telemetry buckets are formed and counts over intervals of time are computed for each bucket. Filtering and anomaly detection is then performed. Filtering a bucket generally removes records to focus the bucket to a more relevant set. In cases where a telemetry bucket represents the first occurrence of an event, the bucket can be filtered based on basic conditions such as a minimum number of records in a bucket, a minimum number of unique devices represented in a bucket, a minimum number of days over which the corresponding event instances occurred, or others that might be relevant to the type of telemetry data. For a telemetry source related to application crashes, several filter conditions may be helpful: if the failure was first seen after a release date for an update (a positive filter); remove bucket records where their current operating system version has insufficient deployment (e.g., less than 70%); and remove bucket records where the distribution of related binaries is insufficient (e.g., less than 70%).

In cases where a telemetry bucket has items that represent an event that has occurred prior to the date of an update, prior event instances can be used to determine whether the recent event instances in the bucket are normal or not. For example, a regular event spike might indicate that a recent event spike is not an anomaly. A baseline historical rate of event instances can also serve as a basis for filtering a bucket, for example, using a standard deviation of the historical rate.

As noted above, spikes in a bucket (e.g., rapid increases in occurrences over time) can serve as features potentially indicating anomalies. Spikes can be detected in various ways. In the case of an application crash telemetry, often there will be a many-to-many relationship between application crashes and event buckets. So, for a given crash or failure, related buckets are found. Then, the buckets are iterated over to find the distribution of the failure or crash among that bucket's updates. Hit counts are obtained from the release date back to a prior date (e.g., 60 days). The hit counts are adjusted for distribution of the crash or failure and hit counts for the crash/failure are adjusted accordingly. Then, pivoting on the corresponding update release date, hit count mean and variance prior to the update are computed. These are used to determine the cumulative probability of the hit counts after the update was released. Buckets without a sufficiently high hit probability (e.g., 95%) are filtered out.

When the buckets have been filtered, one or more heuristics, such as statistical regression, are applied to determine whether any of the buckets indicate that an anomaly has occurred. Analysis for potential regression conditions can be prioritized. For example, in order: the percentage of times an update is present when a crash occurs; the probability that a spike (potential anomaly) does not occur periodically and that the spike is not related to an installation reboot; the possibility that crashes in a crash bucket have resulted in overall binary crashes to rise; the possibility that a crash spike is related to an operating system update and not third party software; the probability that a spike is consistent rather than temporary; the probability that a spike is maximal over an extended time (e.g., months). As suggested above, an anomaly analysis can also depend on whether an event corresponding to a bucket is a new event or has occurred previously. The buckets determined to have anomalies are passed to an update correlator 264.

The update correlator 264 receives the anomalous buckets and accesses update data, such as the update store 220. Updates can be selected based on criteria used for selecting the telemetry buckets, based on a pivot date, based on a user selection, or any new updates can be selected. Correlations between the updates and the anomalous telemetry buckets are then computed using any known statistical correlation techniques, including those discussed elsewhere herein.

Figure 9:
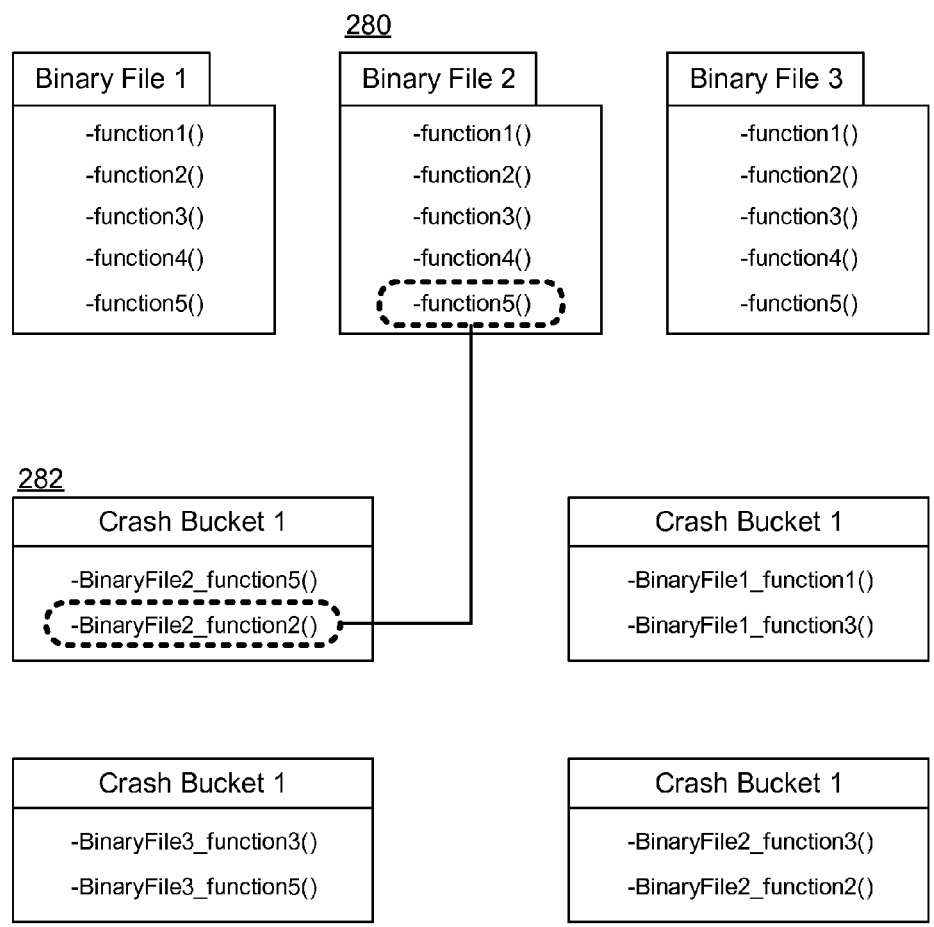
FIG. 9 shows an example of an association between a source code file and a crash bucket.
Figure 10:
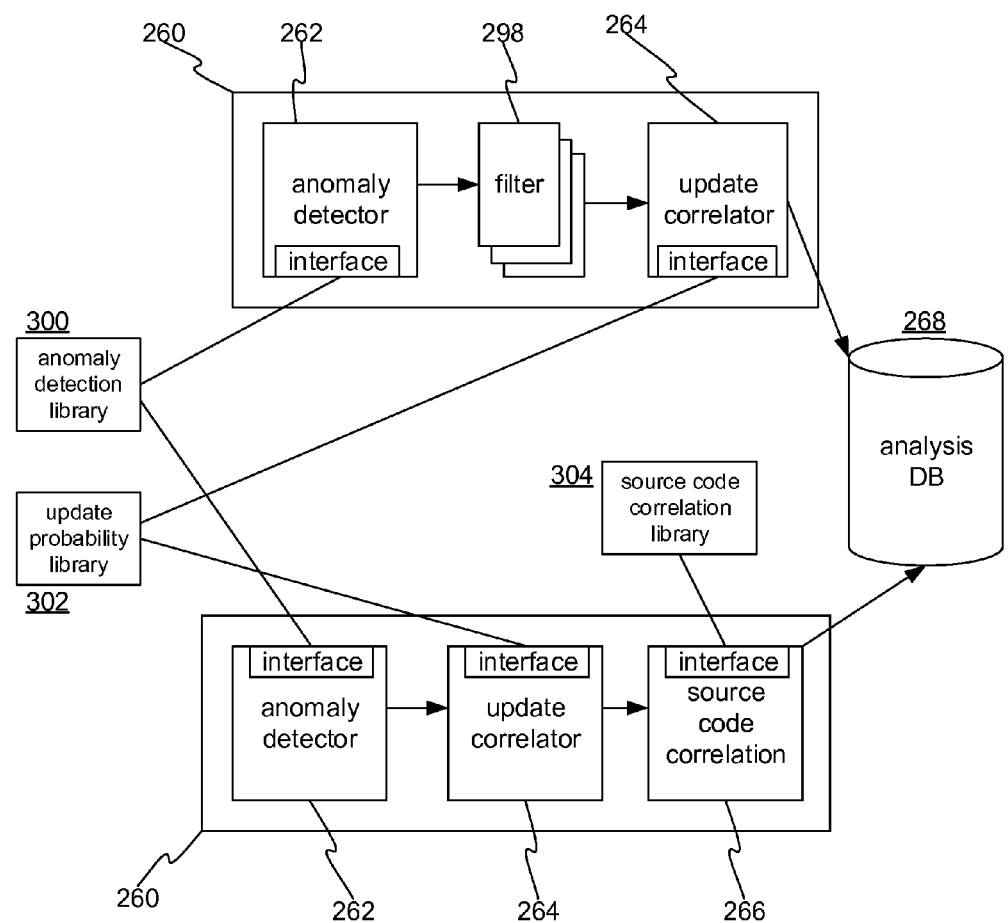
FIG. 10 shows a software architecture that can be used to implement multiple correlation engines for respective telemetry sources.
Figure 11:
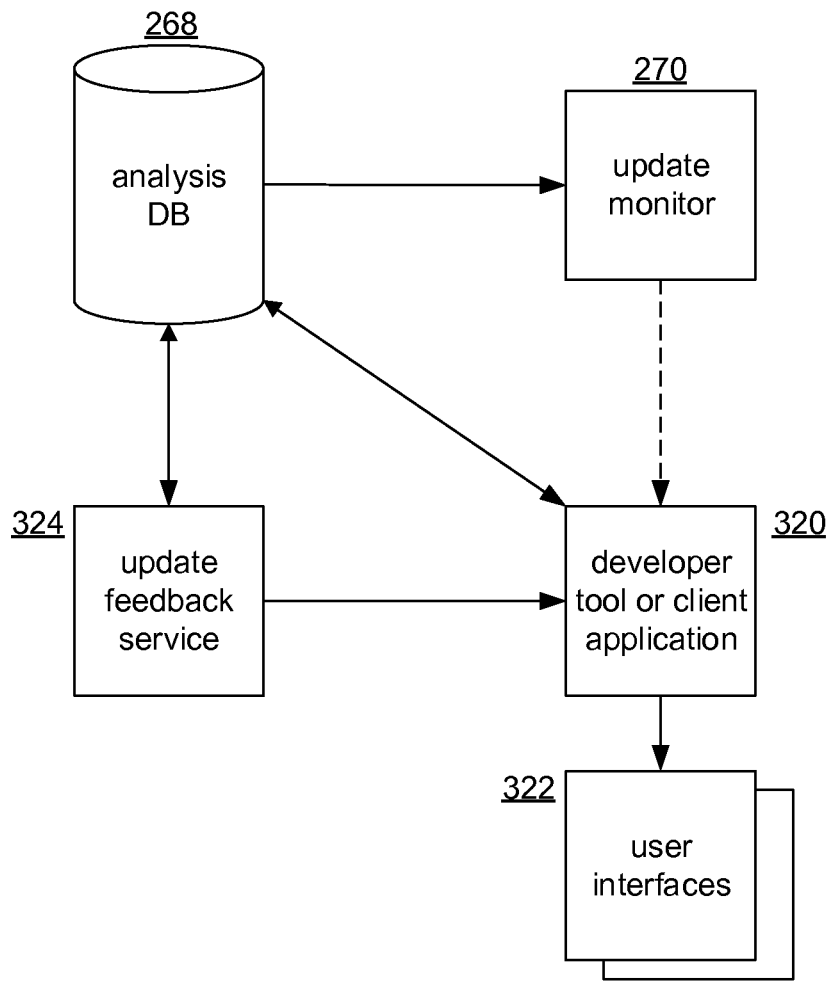
FIG. 11 shows a client application that allows a user to provide feedback and display and navigate analysis output captured in the analysis database.
Figure 12:
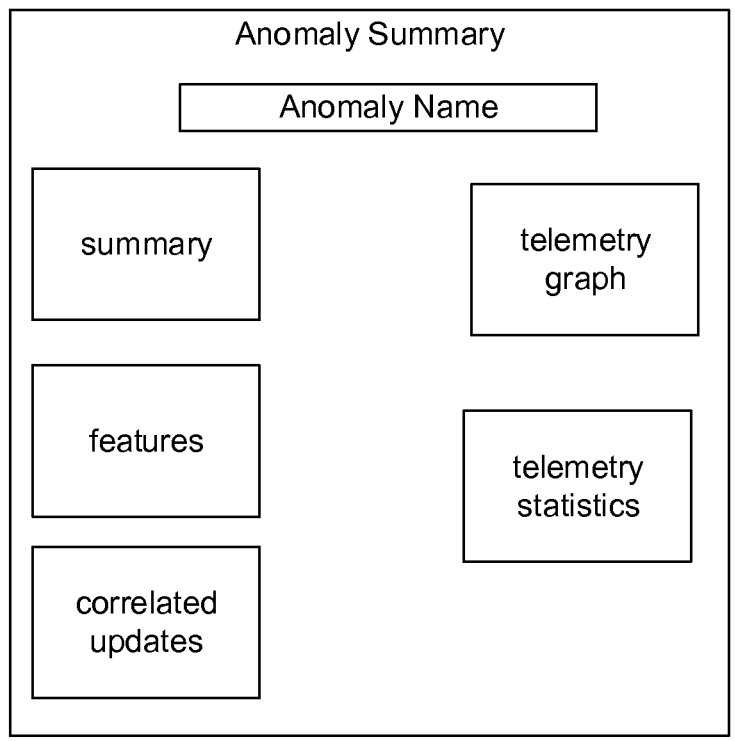
FIG. 12 shows an example of an anomaly summary user interface.
Figure 13:
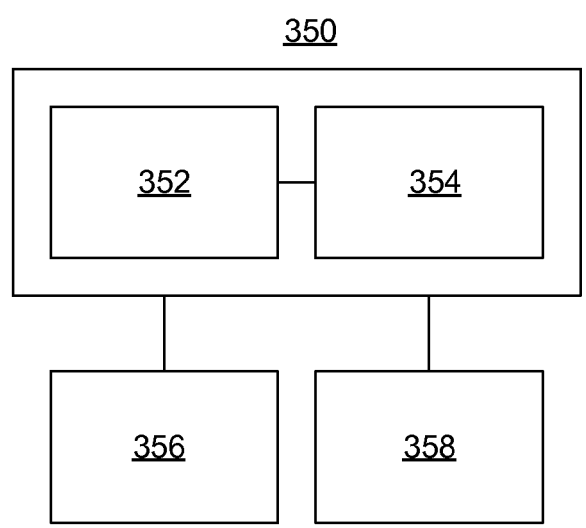
FIG. 13 shows an example of a computing device.

As mentioned above, if detailed update information is available (see change table 226), then depending on the granularity of that information, more specific correlations with anomalies can be found. A source code correlator 266 can be provided to receive correlations between updates and anomalies. The source code correlator 266 determines the correlation of source-code changes per a software update and its correlated telemetry anomaly bucket. Each correlation between a source code change and an anomaly is assigned a rank based on the level of match between the source-code change and the source-code emitting the telemetry points in the anomaly bucket. If a direct match is not found, a search of the call graph (or similar source-code analysis) for the source-code that emitted the telemetry and for the changed source-code list is performed to arrive at a prioritized list of source-code changes that could be causes of the anomaly. FIG. 9 shows an example of an association between a source code file 280 and a crash bucket 282. Because the source code file 280 has a function implicated in the crash bucket 282, the telemetry event instances that make up the crash bucket 282 can be used to find a likelihood of correlation between the source code file 280 and the crash bucket 282. In addition, if the crash bucket 282 has information about a specific function (or even a line number of code offset), as shown in FIG. 9, a correlation with the function can also be computed.

Returning to FIG. 8, outputs of the correlation engine 260, such as records of anomaly buckets, records of update-anomaly correlations, and records of source code-anomaly correlations, are stored in an analysis database 268. Tools, clients, automation processes, etc., can access the analysis database 268. For example, an update monitor 270 monitor the analysis database 268 to identify new anomalies and their associated updates. The update monitor 270 can use this information to send instructions to an update controller 272. The update controller 272 controls aspects of updating, such as retracting updates available to be transmitted to devices or constraining the scope of availability for updates (e.g., to a particular region, platform, language, operating system). Because the correlation engine 260 can analyze telemetry feedback about updates in near real-time, anomaly-update correlations can be identified even as updates are still rolling out to devices. This can allow updates to be withdrawn or throttled soon after their release, potentially avoiding problems from occurring on devices yet to receive the updates. In addition, anomalies can be spotted for updates that have different binaries for different operating systems or processor architectures. Put another way, a correlation engine can find correlations using telemetry from, and updates to, heterogeneous devices.

The update monitor 270 can also be used to evaluate the effectiveness of updates that are flagged as fixes. A pre-existing event (bucket) can be linked to an update and the effectiveness of the update can be evaluated with feedback provided through a user interface of the update monitor 270. An update can be deemed effective if the associated event/anomaly drops below a threshold occurrence rate.

The update monitor 270 can also be implemented as a client with a user interface that a developer uses to look for issues that might be related to updates identified by the developer. Or, a user can select an anomaly and see which updates, source code files, etc., are associated with the anomaly. In one embodiment a dashboard type of user interface is provided, which can display the overall health of the devices as reflected by anomalies in the analysis database 268. Anomalies can be evaluated by their extent (by geography, device type, etc.), their rate of increase, and so on. The dashboard can display alerts when an update is determined to be causing an anomaly. In the case where an update is flagged as a fix intended to remedy an anomaly, the dashboard can provide an indication that the update was successful.

The multiple correlation engines 260 can use the same update data. Differences in types of telemetry data necessarily lead to partially differing implementations. For example, the filters 298 used by one correlation engine 260 may differ from those used in another correlation engine 260. Nonetheless, some of the anomaly detection and correlation algorithms can be used by any correlation engine 260. Generic anomaly detection functions, such as a CDF, can be included in an anomaly detection library 300. Similarly, generic algorithms, such as regression algorithms for determining the probability that an anomaly is due to a given software update, can be provided by an update probability library 302. Functions for finding correlations between a telemetry anomaly and a source-code change for a given software update can be provided by a source code correlation library 304, which is available for any correlation engines 260 that can make use of it. The update probability library 302 and the source code correlation library 304 can also provide abstracted access to update data and source code change data.

In one embodiment the correlation engines operate as online algorithms, processing telemetry data and update data as it becomes available. Once a correlation engine 260 has determined all anomalies at the current time, it feeds the relevant information into the above-mentioned reporting dashboard (via the analysis database 268). The update monitor 270 or other tool can include ranking logic to rank anomalies correlated to updates. Types of anomalies, updates, source code files, etc., can be assigned weights to help prioritize the ranking. Other criteria may be used, such as the magnitude or rate of an anomaly, the duration of an anomaly, the number of anomalies correlated to a same update, and so forth. Anomalies and/or updates can be displayed in the order of their priority ranking to help developers and others to quickly identify the most important issues that need to be addressed.

Feedback can inform the supervised learning discussed above. The client application 320 displays user interfaces 322. The user interfaces 322 can display information discussed above, such as indicia of anomalies ordered by priority, problematic updates, etc. In one embodiment, the anomaly detection/correlation analysis can be provided as a network feedback service 324 that is available to any entities responsible for some of the updates being applied to the devices. An operating system vendor can operate the telemetry infrastructure. Any third party developer is given access to anomaly/update analysis related only to the third party's software for which updates have been issued. It should be noted that the software designs described herein are partly a result of convenience. In practice, different components can be distributed to various responsible parties.

The anomaly summary user interface 322 might include: a name or identifier of the anomaly; summary information, such as a date the anomaly was identified, the type of anomaly (e.g., a spike), and scope of the anomaly (e.g., an affected operating system or processor); features of the anomaly like the probability that detection of the anomaly is correct and a measure of the anomaly; a listing of correlated updates and their occurrence rate; a telemetry graph showing counts of instances of the anomaly over time; and telemetry statistics such as an average daily count, counts before and after an update, unique machines reporting the event, and others.

The computing device 350 can be any type of device having processing hardware 352 (e.g., CPU(s) and/or GPU(s)), storage hardware 354 able to be read from or written to by the processing hardware 352, possibly an input device 356 such as a mouse, camera, microphone, touch sensitive surface, sensor, or others, and possibly also a display 358 of any known type. One or more of the computing devices 350 implement the software components described above that relate to telemetry, updates, and synthesis thereof.

Embodiments and features discussed above can also be realized in the form of information stored in volatile or non-volatile computer or device readable hardware. This is deemed to include at least hardware such as optical storage (e.g., compact-disk read-only memory (CD-ROM)), magnetic storage, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of correlating software updates and indications of anomalies occurring on devices at least some of which have the software updates, the method comprising:
   accessing update installation information indicating which of the software updates were applied to which of the device and update times thereof;
   accessing a telemetry data source, the telemetry data source comprising indications of occurrences of same events on the devices, the indications of occurrences having been received from the devices via a data network, each indication of an occurrence indicating which event occurred and on which corresponding device and a time of occurrence thereof;
   identifying anomalies in the telemetry data source by computing counts of the events therein based on the times of occurrence of the events;
   identifying a set of updates by determining which of the anomalies are correlated with which of the updates according to the times of occurrence and according to the update times;
   accessing source code change data that indicates which source code changes are associated with which of the updates;
   finding correlations between the source code changes and the anomalies by, based on the identified set of updates and the source code change data, identifying source code changes associated with the identified set of updates, wherein the finding the correlations between the source code changes and the anomalies comprises applying a heuristic that computes correlation scores or probabilities for pairings of updates and anomalies; and
   for each anomaly, storing indications of any source code changes determined to be correlated with the anomaly.

2. A method according to claim 1, wherein the anomalies are determined as they are occurring on some of the devices and only some of the updates are determined to be correlated with anomalies.

3. A method according to claim 1, wherein the telemetry data source comprises either an operating system crash telemetry, an application crash telemetry, a logging telemetry, or an application diagnostic telemetry.

4. A method according to claim 1, wherein the telemetry data source comprises user feedback obtained by analyzing published text comments.

5. A method performed by one or more computing devices, the method comprising:
   accessing a plurality of types of telemetry data sources, each telemetry data source comprising a different type of software performance feedback received from devices;
   forming pluralities of data sets from each of the respective telemetry data sources, each data set comprising counts of software event instances on the devices as a function of time from a corresponding telemetry data source;
   analyzing each data set to determine whether the data set comprises an anomaly, wherein the analyzing comprises applying a cumulative distribution function comprising a modified cumulative distribution function that is informed by a supervised learning algorithm; and
   computing correlations of software updates of the devices with the data sets determined to comprise respective anomalies, wherein multiple software updates are applied to the devices during timespans that at least partially overlap with timespans of the data sets; and automatically controlling distribution, application, or availability of one or more of the software updates based on the one or more of the software updates having been sufficiently correlated with one or more of the data sets determined to comprise anomalies.

6. A method according to claim 5, wherein the analyzing further comprises, for a data set determined to have an anomaly, determining a scope of a geographical region of devices that reported telemetry data corresponding to the anomaly.

7. A method according to claim 5, further comprising filtering the data sets based on previous counts of event instances.

8. A method performed by one or more computing devices, the method comprising:
   finding event buckets for respective events, each event bucket comprising counts of event instances for respective periods of time, each event instance comprising an occurrence of a corresponding event on a device that was reported by the device over a network via a telemetry feedback system, wherein each count is a count of only occurrences of a single corresponding event for a single corresponding period of time;
   finding change records, each change record representing a change instance of a software change of a corresponding device, each change record indicating which corresponding device was changed and indicating a time corresponding to the represented change instance, the change records representing change instances of a plurality of software changes;
   analyzing the event buckets to identify which of the event buckets comprise an anomaly; and
   based on the change records and the identified event buckets, determining which of the software changes are correlated with which of the identified event buckets, and displaying or storing correlation information indicating which of the software changes were determined to be correlated with which of the identified event buckets, wherein the method is performed repeatedly to determine the software changes as the software changes are being applied to the computing devices over the network.

9. A method according to claim 8, wherein the determining which of the software changes are correlated with which of the identified event buckets comprises a regression analysis.

10. A method according to claim 8, further comprising finding correlations between the identified event buckets and source code files associated with the identified event buckets.

11. A method according to claim 10, further comprising identifying the source code files based on the source code files having changed in association with one or more of the software changes.

12. A method according to claim 10, wherein the finding correlations for the source code files comprises computing probabilities of correlation for the respective source code files.

13. A method according to claim 8, wherein the method is performed repeatedly to identify the anomalies in substantially real-time.

* * * * *